United States Patent [19]
Scerbak et al.

[11] Patent Number: 4,734,912
[45] Date of Patent: Mar. 29, 1988

[54] LASER DIODE END PUMPED ND:YAG SINGLE MODE LASER

[75] Inventors: David G. Scerbak, Morgan Hill; Leonard P. Pearson, Palo Alto, both of Calif.

[73] Assignee: Lightwave Electronics Corp., Mountain View, Calif.

[21] Appl. No.: 871,490

[22] Filed: Jun. 6, 1986

[51] Int. Cl.$^4$ ............................................. H01S 3/10
[52] U.S. Cl. ..................................... 372/27; 372/105; 372/71; 372/75; 372/19; 372/20; 372/107; 372/108
[58] Field of Search ....................... 372/34, 27, 70, 71, 372/75, 65, 20-21, 32, 19, 105

[56] References Cited
U.S. PATENT DOCUMENTS

| | | | |
|---|---|---|---|
| 4,305,046 | 12/1981 | LeFloch et al. | 372/27 |
| 4,408,334 | 10/1983 | Lundstrom | 372/27 |
| 4,653,056 | 3/1987 | Baer et al. | 372/34 |
| 4,656,433 | 4/1987 | Franklin et al. | 372/27 |
| 4,656,635 | 4/1987 | Baer et al. | 372/27 |

*Primary Examiner*—Léon Scott, Jr.
*Attorney, Agent, or Firm*—Harry E. Aine

[57] ABSTRACT

A diode pumped Nd:YAG laser is disclosed. The YAG rod is coated on its ends to define an optical resonator containing the YAG rod. The YAG rod is made sufficiently short, i.e., 1 mm, so that it will support only two axial resonant (lasing) modes. The rod is transversely stressed to polarize the two original modes and to excite a third lasing mode orthogonally polarized to the first two modes. The third mode is separated from the first two modes to provide stable, single mode $TEM_{001}$ output. The transverse stress is applied by means of a spring clamp made of a material, Be-Cu, having a low temperature coefficient.

15 Claims, 4 Drawing Figures

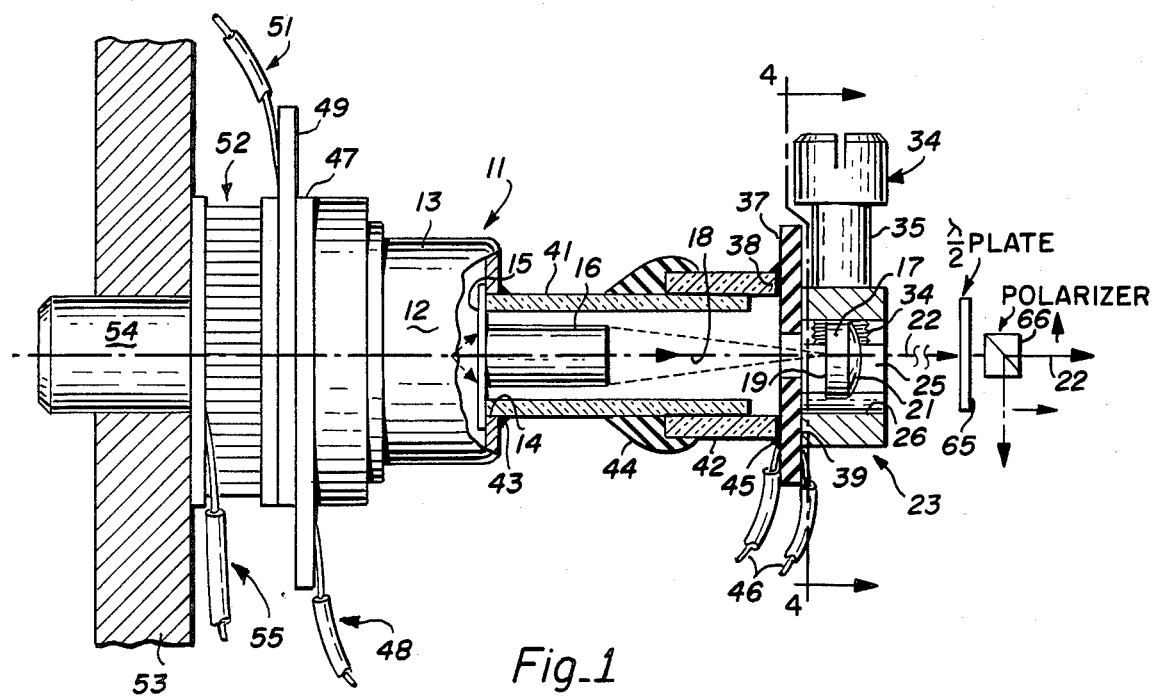
Fig_1
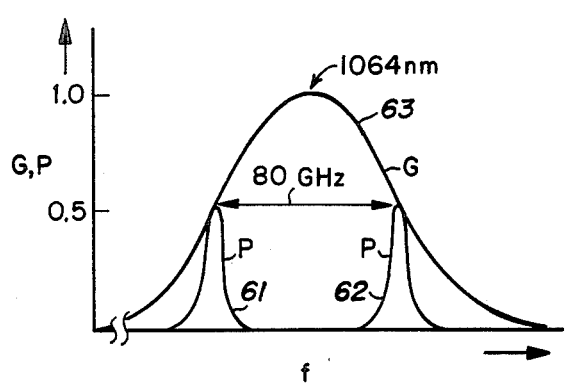
Fig_2
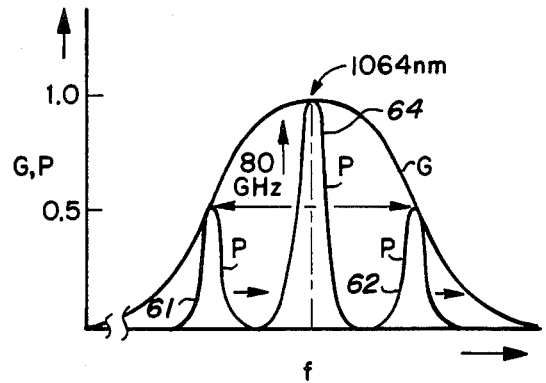
Fig_3
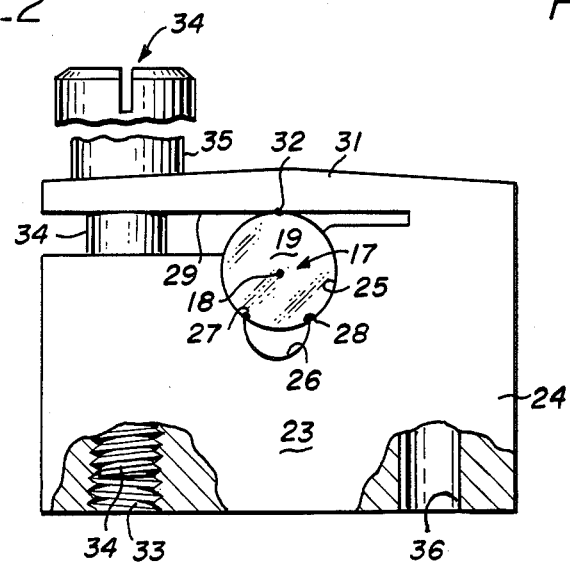
Fig_4

LASER DIODE END PUMPED ND:YAG SINGLE MODE LASER

BACKGROUND OF THE INVENTION

The present invention relates in general to laser diode pumped solid state single-mode lasers and, more particularly, to an improved end-pumped Nd:YAG single-mode laser.

DESCRIPTION OF THE PRIOR ART

Heretofore, laser diode end-pumped Nd:YAG lasers have been proposed. One such laser utilized a GaAlAs laser diode pump producing an optical pumping beam of a wavelength of 809 nanometers focused by means of a gradient index (Selfoc) lens into a Nd:YAG laser rod for optically pumping the rod. The laser rod had mirrors formed on opposite ends thereof for defining the optical resonator containing the laser rod. The laser rod had a length of approximately 5 millimeters with a diameter of 2 millimeters and each end had a radius of curvature of 19 millimeters. The optically pumped YAG laser reportedly produced output power up to 2 milliwatts at 1,064 nanometers wavelength with laser diode pumping powers in excess of 2.3 milliwatts, i.e., from 2.3 milliwatts to 10 milliwatts. The polarization of the output power of the YAG laser was indeterminate unless a small amount of stress was applied transversely to the laser rod. The polarization of the output beam at 1,064 nanometers was reported to be always parallel, never perpendicular to the applied stress.

The single axial mode power from a 5 millimeter long YAG rod was reported to be in the range of output power from 0–1.2 milliwatts. Above 1.2 milliwatts of output power, it was reported that the second axial mode began to interfere and the output no longer was pure single mode. For a 3 millimeter long YAG rod, it was reported that the output power could reach as high as 8 milliwatts before interference was encountered from the second axial mode of the laser rod. However, for the 3 millimeter rod, it was considered that this was too short for optimum laser diode pumping efficiency and exceeded the power output capabilities of the laser diode pump such that the second axial mode threshold was achieved by pumping the YAG rod by means of a dye laser.

The aforedescribed laser diode end pumped Nd:YAG laser is described in an article entitled: "Efficient, Frequency-stable laser diode pumped Nd:YAG laser", appearing in Optics Letters, Vol. 10, No. 2 of February 1985 at pgs. 62–64.

Others have reported that for such a diode laser end-pumped Nd:YAG laser, single-mode operation is difficult to maintain at YAG laser power output levels above 8 microwatts. This is reported in an article entitled: "Diode-Laser-Pumped Nd:YAG Laser Injection Seeding System" appearing in Applied Optics, Vol. 25, No. 5 of March 1986, pgs. 629–633.

Thus, it is desired to obtain a laser diode end-pumped Nd:YAG laser producing single-mode power at 1,064 nanometers at power levels well above 8 microwatts c.w.

SUMMARY OF THE PRESENT INVENTION

The principal object of the present invention is the provision of an improved laser diode end-pumped solid state single-mode laser.

In one feature of the present invention, the optical path length of the optical resonator containing the solid end-pumped lasant material is dimensioned to be sufficiently short such that essentially only two non-polarized optically resonant axial modes of the optical resonator will lase and then transversely stressing the pumped lasant material to produce a third resonant mode orthogonally polarized to the first two modes and having a resonant optical wavelength inbetween the first two modes, whereby the energy of the third excited optical mode can be separated from the first two optical modes to produce a single-mode linearly polarized output.

In another feature of the present invention, the solid member of lasant material is selected from the group consisting of Nd:YAG and Nd:doped glass.

In another feature of the present invention, the third excited resonant mode is separated from the first two resonant modes by means of a polarization-sensitive optical separator.

In another feature of the present invention, the solid member of lasant material is stressed with sufficient intensity so that the wavelength of the third resonant mode is stress adjusted to be generally midway between the wavelengths of the first two excited resonant modes, whereby the power output from the third mode is greater than that from the first two orthogonal modes.

In another feature of the present invention, the transverse stress is applied to the solid lasant material by means of a beryllium copper clamp, whereby the applied stress is rendered generally temperature independent.

Other features and advantages of the present invention will become apparent upon a perusal of the following specification taken in connection with the accompanying drawings wherein:

BRIEF DESCRIPTION OF THE DRAWINGS

FIG. 1 is a side, elevational view, partly broken away and partly schematic of a laser diode end-pumped single-mode Nd:YAG laser incorporating features of the present invention, FIG. 2 is a plot of normalized gain, G, for the optically pumped solid lasant material as a function of wavelength and also including a plot of the normalized power of the two non-polarized resonant axial modes for the unstressed lasant material in the laser of FIG. 1, FIG. 3 is a plot similar to that of FIG. 2 showing the condition obtained when the lasant material is transversely stressed and the intensity of the stress is adjusted for centering the wavelength of the third resonant mode midway between the wavelengths of the other two orthogonally polarized axial modes of resonance for the laser of FIG. 1, and FIG. 4 is an end view, partly broken away of a portion of the structure of FIG. 1 taken along line 4—4 in the direction of the arrows.

DESCRIPTION OF THE PREFERRED EMBODIMENTS

Referring now to FIG. 1, there is shown a laser-diode-end-pumped Nd:YAG single-mode laser 11 incorporating features of the present invention. The laser 11 includes a laser diode pump 12, such as a Model LT030Md GaAlAs laser diode commercially available from Sharp which produces an output beam of laser radiation at a wavelength of 750 nanometers with a typical output power of approximately 5 milliwatts. The laser diode 12 includes a metallic envelope 13 centrally apertured at 14 with the aperture 14 being closed over by means of a thin, optically transparent membrane 15 forming an output window.

A Selfoc or gradient index lens 16 is cemented directly to the membrane 15 by means of a refractive index matching adhesive such as u.v. curing optical cement Model No. 61, commercially available from Norland Products, Inc. of New Brunswick, N.J. The optical cement has a refractive index $n=1.5$ and index matches the refractive index of the membrane $n=1.48$ to the refractive index $n=1.6$ of the gradient index lens 16. In a typical example, the Selfoc lens 16 is a Model SLH-1.8-0 22 P, commercially available from NSG. of America.

The Selfoc lens 16 focuses the image of the source of the laser diode 12 onto the input planar face of a short length of a rod 17 of generally non-birefringent lasant material such as Nd:YAG disposed on the optical axis 18. In a typical example, the rod 17 of lasant material has a diameter of 2 millimeters and a length of 1 millimeter and is coaxially arranged with the output beam of the pump 12 and the Selfoc lens 16, and is on the optical axis 18 of the laser 11. As an alternative, the lasant rod 17 is made of non-birefringement Nd:doped glass.

An optical resonator is formed by coating opposite ends of the rod of lasant material 17 with reflective coatings at 19 and 21. The reflective coating 19 on the input face of rod 17 has a high reflectivity at 1.06 microns, i.e., it has a reflectivity greater than 99.9% and is optically transmissive at the pump wavelength of 750 nanometers, i.e., it is greater than 85% transmissive at that wavelength. The mirror coating 21 on the output face of the rod 17 is coated to be 0.75% transmissive at the output wavelength of 1,064 nanometers such that a small percentage of the resonant optical radiation within the rod 17 is coupled out of the optical resonator defined by mirrors 19 and 21 as an output beam 22. The output mirror 21 on the rod 17 has a radius of curvature as of 10 millimeters. It is outwardly domed or concave in shape facing into the rod 17 for focusing the optical radiation within the rod 17 back toward the opposing mirror 19. The optical resonator is coaxial with the optical axis 18, whereby the conversion efficiency is increased.

Referring now to FIGS. 1 and 4, the lasant rod 17 is held within a clamp assembly 23 made of a spring material having a spring constant with a low temperature coefficient, such as beryllium copper. The clamp 23 includes a central body portion 24 having an axially directed bore 25 to receive the rod 17 coaxially thereof. The inside diameter of the bore 25 is slightly greater than the outside diameter of the rod 17 and a smaller diameter relief bore 26 extends parallel to bore 25 and intersects therewith to provide a pair of bearing lines 27 and 28 at the intersecting corners of bores 25 and 26 and bearing upon the rod 17 in relatively close proximity along one side edge thereof. In a typical example, the block 24 is 0.310" wide, 0.100" thick, and 0.225" high. The bore 25 has a diameter of 0.081". Bore 26 has a diameter of 0.040". The axis of bore 26 is coincident with the wall of bore 25.

The clamp body 24 is transversely slotted at 29 to define a cantilever lever portion 31 which bears against the rod 17 along a line 32 of tangency generally diametrically opposed and inbetween bearing lines 27 and 28. The block 24 includes a tapped transverse bore at 33 to receive a screw 34. The screw 34 includes a shaft having a shoulder portion 35 bearing against the end of the bored cantilever member 31. By adjusting the screw 34, more or less transverse stress is applied to the rod 17 by means of the cantilever 31 and bearing points 27 and 28. A second transverse bore 36 is provided in the body 24 to receive a thermistor for sensing the temperature of the clamp 23. In a typical example, the slot 29 is 0.030" wide and the cantilever 31 has a thickness of 0.020" and a length of 0.250".

The clamp 23 is epoxied to a centrally apertured mounting plate 37 as of alumina ceramic and a thick-film resistor 38 is deposited on the mounting plate 37 for heating the plate 37 and clamp 23 to a desired operating temperature. The clamp 23 is affixed to the plate 37 by a suitable adhesive such as thermally conductive epoxy at 39.

The mounting plate 37 is secured to the envelope 13 of the laser diode 12 pump via the intermediary of a pair of telescoping Pyrex glass tubes 41 and 42. Glass tube 41 is affixed as by epoxy adhesive to the inner lip of the central aperture 14 in the envelope 13 of the diode 12 at 43. Glass tube 42 is coaxially mounted of and bonded to glass tube 41 by means of an epoxy seal at 44. Similarly, glass tube 42 is bonded to the mounting plate 37 via epoxy at 45. In a typical example, Pyrex glass tube 41 has a wall thickness of 0.25 millimeters and is commercially available from Vitro Dynamics of Rockaway, N.J., likewise Pyrex glass tube 42 is commercially available from the same source and has a wall thickness of 0.3 millimeters. Heating current for driving the thick film heater 38 is applied to pads on the mounting plate 37 via leads 46.

The laser diode 12 is mounted to a ceramic mounting plate 47, as of alumina, having metallized leads thereon for making electrical connections to the diode 12 via leads 48. Ceramic mounting plate 47 is bonded to a second ceramic plate 49 having a thermistor mounted thereon for sensing the temperature of the diode 12. An electrical connection is made to the thermistor via leads 51. A thermoelectric cooler 52, such as a Model FC 0.45-66-05L commercially available from Melcor of Trenton, N.J., is disposed inbetween the thermistor carrying a ceramic plate 49 and a heat-sink plate 53 as of aluminum. A pin 54 is carried centrally of the heat sink plate 53 on the axis 18 of the device for mounting the laser 11 relative to another rotatable support member, not shown. The thermoelectric cooler 52 has its cold junction facing the ceramic plate 49 and diode 12 for cooling the diode 12 in use. Typically, the cold junction of the thermoelectric cooler is maintained within the temperature range of 10 to 15 degrees C.

In operation, approximately 100 milliwatts of d.c. input power is fed to the laser diode pump 12 to produce between 5 and 8 milliwatts of single-mode output power from laser diode pump 12 at 750 nanometers. This pump radiation is collected by the Selfoc lens 16 and focused onto the input face 19 of the YAG rod 17. With no stress applied to the laser rod 17 and with the laser rod 17 being dimensioned to be sufficiently short, i.e., on the order of 1 millimeter in length, only two axially resonant modes of oscillation will be supported (lase) within the optical resonator. These resonant modes of oscillation are shown in FIG. 2 at 61 and 62 and have a frequency separation of approximately 80 gigahertz, corresponding to adjacent axial modes of oscillation within the optical resonator. These lasing modes of oscillation 61 and 62 are not polarized and are disposed on opposite sides of the center of the gain profile curve 63 for the Nd:YAG laser rod. Half power points on the gain curve for the laser rod 17 are approximately 120 gigahertz apart as pumped from the laser diode 12 with the aforedescribed power levels.

When the screw 34 is tightened to produce predominantly a transverse stress on the laser rod 17, the two resonant modes 61 and 62 become linearly polarized in a direction orthogonal to the direction of the stress and a third resonant mode of oscillation arises as shown at 64 in FIG. 3. This third resonant mode of oscillation 64 has a linear polarization parallel to the direction of the transverse stress and orthogonal to the polarization of the two other modes of oscillation, namely, 61 and 62. The stress is adjusted to center the third mode of oscillation 64 midway between the two other modes of oscillation 61 and 62 and preferably at the peak (1,064 nm) of the gain curve 63 such that the power in the third mode 64 is greater than that in either of the two other orthogonal modes 61 and 62. The stress produced polarization is due to a stress related birefringence in the lasant material.

The output beam 22 from the laser 11 is thence fed through a one-half wave plate 65 which is rotatable about the optical axis 18 of the laser to rotate the orientation of the orthogonal linearly polarized modes 61, 62 and 64 in a plane normal to the optical axis 18. A linear polarizer 66 is disposed on the optical axis 18 to receive the output beam 22 from the halfwave plate 65. The halfwave plate 65 is rotated relative to the polarizer 66 so as to bring the polarization of the third resonant mode 64 into alignment with one of the axes of the polarizer 66 so as to separate the radiation in the third resonant mode 64 from the radiation in the other two orthogonal modes 61 and 62.

The third mode linearly polarized radiation at 1,064 nm then serves as the output beam 22. In a typical example, the output beam 22, at the output of the polarizer 66, has approximately 200 microwatts of TEM$_{001}$ radiation at 1.06 microns or 1,064 nanometers. This radiation is also single-mode consisting of the single axial mode 64. The radiation is also tunable by varying the temperature of the resonator and the laser rod 17 by adjusting the heating current supplied to the thick film heater 38 via leads 46. The temperature of the laser rod 17 is detected or sensed by the thermistor mounted within the bore 36 in the clamp 23. When the output frequency of the laser 11 is tuned, thermally, the three resonant modes 64, 61 and 62 tune together and their frequency separation is maintained even though the center frequency is shifted or tuned thermally. Similarly, the output wavelength of the laser diode pump 12 is thermally tuned by controlling the temperature of the diode 12 by means of the power fed to the thermoelectric cooler 52. The diode temperature is sensed by the thermistor carried from plate 49. The diode pump 12 is thermally tuned to maintain the gain profile centered at the laser output wavelength.

In a typical example, the halfwave retardation plate 65 is commercially available as Model WP-2-050-106-LM-M2 from Virgo Optics, Inc. of Port Richey, Fla. and the polarizer 66 comprises a thin film polarizer Model TFP29R-1.06 which is supported on a post at Brewster's angle and is commercially available from Northwest Optical, Inc. of Burleigh Park, Fishers, N.Y.

The laser 11 of FIG. 1 is potted in a thermally insulative epoxy foam, not shown, to provide thermal isolation and to increase the strength of the assembly. Also, the glass tubes 41 and 42 between the heated clamp 23 and the cooled diode 12 provide thermal isolation therebetween.

The advantage of the laser 11 of the present invention is that the amount of single-mode output power that can be obtained from a laser diode pumped monolithic laser has been increased by over an order of magnitude and the single-mode output power can be tuned thermally while maintaining a stable output.

What is claimed is:

1. In a method for producing single-mode, linearly polarized, coherent radiation at optical wavelengths, the steps of:

generating a beam of coherent optical pumping radiation from a diode laser;

directing the beam of optical pumping radiation through a solid member of generally non-birefringent lasant material to optically pump said member of lasant material and to provide a gain bandwidth having a characteristic peaked gain curve;

disposing said member of lasant material within an optical resonator having an optical axis passing through the member of lasant material for exciting a plurality of resonant axial modes of said optical resonator with coherent optical radiation at a plurality of optical wavelengths;

dimensioning the optical path length of the optical resonator to be sufficiently short such that essentially only two adjacent non-polarized optical resonant axial modes of said resonator will lase when centered in frequency on opposite sides of the peak of the gain curve within the optical resonator containing the optically pumped member of lasant material; and stressing the member of lasant material to produce therein a stress with a predominant component transverse to the optical axis of the optical resonator to produce a stress related birefringence of said lasant material causing linear polarization of the two excited axial modes of the optical resonator along an axis normal to the direction of the stress in the member of lasant material and to produce a third excited axial mode of optical resonance of said optical resonator, said third mode of resonance being linearly polarized parallel to the direction of the applied stress and having a resonant optical wavelength inbetween the optical wavelengths of said first two excited optical resonant modes, whereby the energy of the third excited optical mode can be separated by a polarization sensitive device from the energy of the first two excited optical modes to produce a single-mode linearly polarized output.

2. The method of claim 1 including the step of directing the beam of optical pumping radiation into the member of lasant material along an axis generally collinear with the optical axis of the optical resonator containing the member of lasant material, whereby conversion efficiency is increased.

3. The method of claim 1 including the step of making the member of solid lasant material of a material selected from the group consisting of Nd:YAG and Nd:doped glass.

4. The method of claim 1 including the step of:
directing energy of the first two and the third excited resonant modes of the optical resonator into a polarization sensitive separator for separating the energy of the first two resonant modes from that of the third resonant mode.

5. The method of claim 1 wherein the step of stressing the solid member of lasant material includes a step of adjusting the stress so that the wavelength of the third resonant mode is generally midway between the wavelengths of the first two excited resonant modes.

6. In a laser apparatus for producing single-mode linearly polarized, coherent radiation at optical wavelengths:
   a laser diode for generating a beam of coherent optical pumping radiation;
   an optical resonator having an optical axis therein;
   a solid member of generally non-birefringent lasant material disposed within said optical resonator on the optical axis of said resonator;
   means for directing the beam of optical pumping radiation into said solid member of lasant material as disposed within said optical resonator for optically pumping same to produce an optical gain bandwidth having a characteristic peaked gain curve and for exciting a plurality of resonant axial modes of said optical resonator with coherent, optical radiation at a plurality of optical wavelengths;
   said optical resonator being dimensioned to be sufficiently short such that the optical path length within said optical resonator and through said solid member of lasant material is such that essentially only two non-polarized adjacent optically resonant, axial modes of said resonator will lase when centered in frequency on opposite sides of the peak of the gain curve within the optical resonator containing said optically pumped member of lasant material; and
   means for stressing said member of lasant material to produce therein a stress with a predominant component transverse to the optical axis of said optical resonator to produce a stress related birefringence of said lasant material causing linear polarization of the two excited axial modes of said optical resonator along an axis normal to the direction of the stress in said member of lasant material and to produce a third excited axial mode of optical resonance of said optical resonator, said third mode of resonance being linearly polarized parallel to the direction of the applied stress and having a resonant optical wavelength inbetween the optical wavelengths of said first two excited optical resonant modes, whereby the energy of the third excited optical resonant mode can be separated by a polarization sensitive device from the energy of the first two excited optical modes to produce a single-mode, linearly polarized output.

7. The laser apparatus of claim 6 wherein said means for directing the beam of optical pumping radiation into the member of lasant material directs the beam of pumping radiation along an axis generally collinear with the optical axis of the optical resonator containing said member of lasant material, whereby the conversion efficiency of the laser apparatus is increased.

8. The laser apparatus of claim 6 wherein the member of solid lasant material is selected from the group consisting of Nd:YAG and Nd:doped glass.

9. The laser apparatus of claim 6 including polarization sensitive separator means disposed to receive energy of the first two and third excited resonant modes of said optical resonator for separating the energy of the first two resonant modes from that of the third resonant mode.

10. The laser apparatus of claim 6 wherein said means for stressing said solid member of lasant material includes means for adjusting the stress so that the wavelength of the third resonant mode can be adjusted to be generally midway between the wavelengths of the first two excited resonant modes.

11. The laser apparatus of claim 6 wherein said means for stressing said solid member of lasant material includes a clamp structure, said clamp structure being made of beryllium copper such that the stress exerted on the member of solid lasant material is rendered generally insensitive to temperature fluctuations.

12. The laser apparatus of claim 6 wherein said optical resonator has a length along its optical axis less than two millimeters.

13. In a laser apparatus for producing linearly polarized coherent radiation at optical wavelengths:
   means for generating a beam of coherent optical pumping radiation;
   an optical resonator having an optical axis therein;
   a solid member of generally non-birefringent lasant material disposed within said optical resonator on the optical axis of said resonator;
   means for directing the beam of optical pumping radiation into said solid member of lasant material as disposed within said optical resonator for optically pumping said solid member of lasant material;
   clamp means for stressing said member of lasant material to produce therein a stress related birefringence; and
   said clamp means including means for contacting one side of said solid member of lasant material along a pair of parallel relatively closely spaced lines of contact and including means for contacting said solid member of lasant material along a third line of contact generally diametrically opposed to said first two lines of contact and said third line of contact being generally parallel to said first two lines of contact, whereby the lasant material is transversely stressed to produce the stress-related birefringence therein.

14. The apparatus of claim 13 wherein said clamping means includes a first bore therein to coaxially receive said solid lasant material and said clamping means including a relief bore parallel to and intersecting with said first bore such that the intersecting corners of the first bore and said relief bore define said first and second parallel lines of contact with said solid lasant material.

15. The apparatus of claim 14 wherein said clamp means includes a cantilever portion disposed substantially tangent to said first bore and bearing along a line of tangency on said solid member of lasant material for defining said third line of contact and for applying the stress to said solid member of lasant material.

* * * * *